Patented Nov. 14, 1950

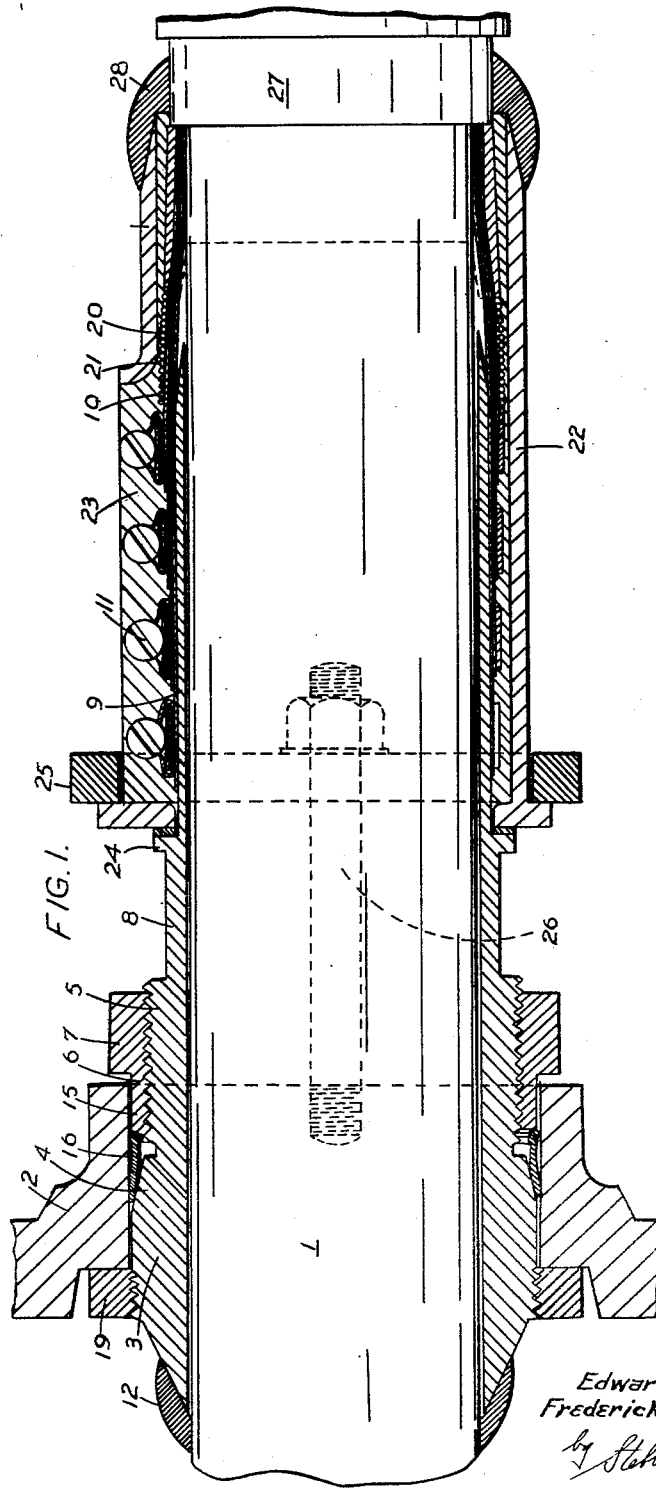

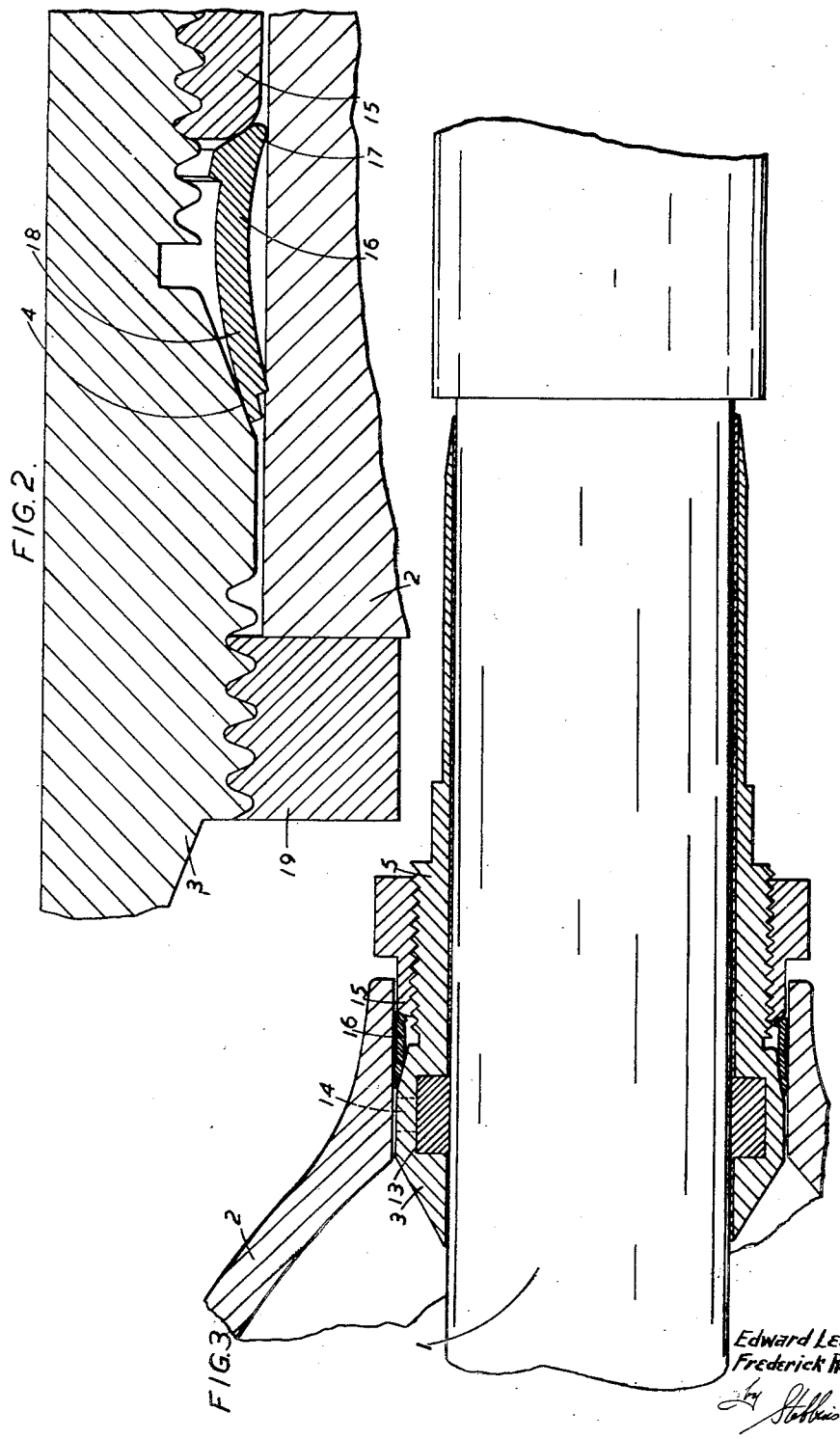

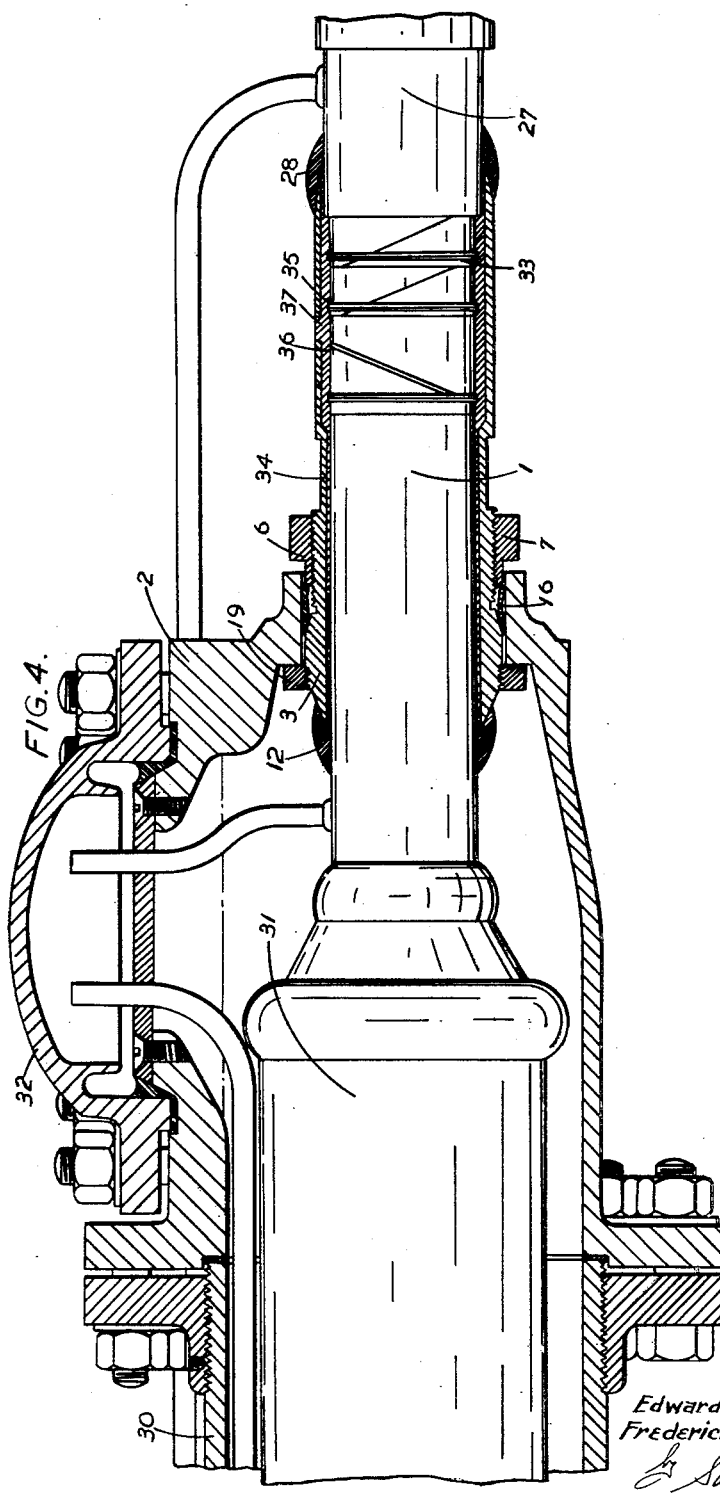

2,530,153

UNITED STATES PATENT OFFICE 2,530,153

FLUID-TIGHT JOINT FOR USE BETWEEN THE PARTS OF AN ELECTRIC CABLE SYSTEM

Edward Leslie Davey, Hale, and Frederick Reginald Credland, Audenshaw, England, assignors to W. T. Glover & Company Limited, Trafford Park, Manchester, England, a British company Application August 26, 1948, Serial No. 46,204
In Great Britain September 5, 1947

6 Claims. (Cl. 174—77)

This invention relates to a joint suitable for making connection between parts of an electric cable system containing fluid under pressure. The joint is of a kind previously known for making connection between pipes and comprising a deformable sealing ring having a cross section substantially greater in its length parallel to the axis than in its radial thickness. Co-operating with this ring is an axially compressing member which acts on one end of the ring and a radially deflecting member, for instance a cone, which acts on the other end part of the ring. Relative axial movement of these two members causes deflection of one end of the ring in such a way that it indents or bites into the adjacent wall of one of the parts to be joined and forms in that way a fluid tight joint between that part and the deflecting member.

In installing an electric cable system, particularly when there is internal fluid pressure, it is important to be able to make readily a fluid-tight joint between parts of the system, for instance between a cable sheath and a joint sleeve or the base of a terminal, which will prevent passage of fluid and can also be disconnected and reconnected as required. In regard to disconnection in particular, it has to be recognised that there is limitation of the movability of parts of the system, the cable commonly being fixed against movement of any kind and an adjacent part associated in the joint being prevented from having movement in one sense. These conditions substantially influence the problem of producing a satisfactory joint.

In the joint in accordance with the invention the radially deflecting member has an outer conical surface and surrounds and is adapted to be permanently attached in a fluid-tight manner to the cable sheath. The sealing ring is applied to the outside of this deflecting member and is operated upon by the compressing member which is a ring working on or in connection with the deflecting member and performs its part by pressing the sealing ring towards that member. The joint is completed by a fourth member which is a part to be joined to the cable, for instance, a sleeve which forms the whole or a portion of the enclosure of a cable joint. This fourth member has an inner cylindrical surface which is a loose fit over the adjacent parts of the deflecting and compressing members and over the sealing ring in its initial condition. Compression and deflection of this sealing ring from its initial condition result in the outward movement of one end of it which then bites into this inner cylindrical surface and makes a tight joint on the one side with this surface and on the other side with the conical deflecting surface.

Examples of joints in accordance with the invention will now be described with reference to the accompanying drawings in which Figure 1 is an elevation, partly in cross section, of a joint, Figure 2 is an enlargement of part of Figure 1, Figure 3 is an elevation, partly in cross section, of an alternative form of joint and Figure 4 is an elevation, partly in cross section, showing a joint used for sealing the sheath of a gas filled cable in an aperture in a joint sleeve.

Referring to Figures 1 and 2, the connection is to be made between the gas retaining sheath 1 of a gas-filled cable and a member 2 through which the cable passes. The latter which may, for example, be a part of a joint sleeve or the base of a terminal, is bored out to a cylindrical surface of somewhat larger diameter than that of the sheath of the cable. The deflecting member 3 which in the assembly lies within this bore has a conical portion 4 and, beyond that conical portion, is reduced further in diameter to a cylindrical part 5 on which is cut a screw thread. On this screw thread works an internally threaded ring 6 which forms the compressing member. This ring is enlarged to form a nut 7 so that it may be forcibly turned on the screw thread of the deflecting member 3.

Beyond its screw threaded part the deflecting member 3 is reduced slightly in diameter and provided with flats 8 by means of which it may be engaged by a spanner and held while the compressing member 6 is turned about it. Beyond the flats the deflecting member 3 is further extended to form a sleeve 9 of substantial length on to which the steel reinforcing tapes 10 of the cable may be applied and secured by clamps 11.

The deflecting member is tapered off to provide an end portion which may be readily attached to the sheath by a wiped joint 12. An alternative method of attachment of the deflecting member to the sheath is shown in Figure 3. Within the larger end of the member 3 there is a recess 13 open to the inside and provided with a hole 14 which gives access from the outside. When the member 3 is in position on the cable, by pouring molten metal into the hole 14 with the appropriate known procedure, a cast joint may be made between the sheath 1 and the surrounding deflecting member 3, the molten metal running by capillary action between substantially the whole of the length of this member and the sheath (on which the member is a good fit)

and forming thereby a strong, permanent and gas-tight connection.

Referring again to Figures 1 and 2, the compressing member 6 at its end has a cylindrical portion 15 which is a loose fit within the cylindrical bore of the member 2. The end of this portion presses on the end of a sealing ring 16 and pushes it towards the conical surface of the deflecting member.

The sealing ring 16 initially has cylindrical inner and outer faces and has a cross-section the length of which is several times greater than its radial thickness. For instance, for a ring of about 3 inches diameter the length may be about ⅝ inch and the radial thickness in the range of .06 to .08 inch. The end 17 of the ring which is directly pressed upon by the compressing member 6 is chamfered inwards at about 45° and thickened up slightly behind the chamfer. The end 15 of the compressing ring 6 is chamfered or rounded off to match. This ensures that the sealing ring 16 cannot move inwards at this end under compression. At the other end 18 the sealing ring is stepped by having a part of the thickness cut away for a short distance from that end of the outside of the ring. The effect of this is providing a thin end to make first contact with the deflecting surface thereby facilitating the outward deflection while providing at the step a second surface for indenting or biting into the cylindrical face of the member 2.

It is preferable but not essential to provide a locking ring which screws on to the deflecting member 3 and bears against the member 2 to resist relative movement between this member and the deflecting member 3 when the compressing member 6 is screwed up. Such a locking ring (19) is used in the construction shown in Figures 1 and 2 but no such ring is used in the construction shown in Figure 3.

To make the joint, the parts are assembled over the end of the cable length, the deflecting member 3 is secured in position on the sheath and the member 2 placed in position and moved to bring its cylindrical bore over the deflecting member and over the space for the sealing ring and part of that for the compressing member. If a locking ring 19 is to be used it is now screwed into position against the member 2. The sealing ring 16 and compressing member 6 are then moved into position and the compressing member 6 is screwed up thereby pressing the sealing ring 16 against the deflecting member 3, deflecting the ring 16 and making a secure joint.

When it is required to open this connection we operate at first on the compressing member 6 which is the only part, other than the locking ring 19, that is then movable relative to the other parts. When this has been drawn back it leaves the sealing ring 16 in its deflected position in secure engagement with the inner face of the member 2, but as the latter can then be moved along the cable away from the conical part of the member 3, the connection can be broken by such a movement, the sealing ring 16 being carried with the member 2. The sealing ring 16 remains in that engaging position and, on remaking the connection, can be once more brought into forcible contact with the deflecting member 3.

Before securing the steel reinforcing tapes 10 of the cable to the extended sleeve 9 of the deflecting member 3 a silk tape pad 20 is applied to the sheath and the reinforcing tapes bound over this pad with wire 21. The clamps 11 are then secured and enclosed in a plumb box 22 which is filled with molten metal 23 by known procedure. The plumb box is held against a flange 24 on the sleeve 9 by a locking ring 25 and pins 26 which screw into the member 2 and joined to the outer sheath 27 of the cable by a joint 28.

Figure 4 shows a joint in accordance with the invention used for sealing a gas-filled cable into a gas-tight jointing sleeve. The same references are used where applicable. The member 2 is an end section of the joint sleeve at one end formed with a cylindrical aperture through which the cable passes and flanged at the opposite end to enable it to be bolted to the main section 30 of the sleeve. The cable joint is enclosed in an inner sleeve 31. The locking ring 19 can be manipulated by insertion of the operator's hand through the aperture covered by the filling dome 32.

The cable shown in Figure 4 has brass reinforcing tapes 33 which are secured to the extension of the deflecting member 3 by a different method from that described with reference to Figure 1. In this case, the tubular extension 34 of the member 3 has an internal diameter larger than the external diameter of the sheath 1. The brass tapes 33 are bound with wire 35 which is then soldered to the tapes. The extension 34 is fitted over the tapes and molten metal 36 poured in through an aperture 37 in the extension 34 to form a cast plumb. The end of the extension 34 is joined to the outer load sheath 27 by a joint 28 as in the first example.

The procedure for making the joint is the same as described with reference to Figure 1, except that between the operations of securing the deflecting member 3 to the sheath 1 and bringing the member 2 into position, the cable joint is made. As described with reference to Figure 1, it is possible to open the connection between the member 2 and the sheath 1 by unscrewing the compressing member 6 and, after breaking the connection between the member 2 and the main part 30 of the joint sleeve, drawing the member 2 along the cable.

The sealing ring must be made of appropriate metal which, while being tough, is somewhat harder than the metal into which it has to bite when deflected. If this metal is brass, a ring of harder brass or of a bronze, for instance, manganese bronze, can be used.

The joint in accordance with the invention is cheaper than the cast plumb joint normally used and has the advantage that the cable dielectric is not subjected to high temperatures during the making of the joint.

What we claim as our invention is:

1. Means for making a fluid tight joint between the sheath of an electric cable and a member formed with an aperture, having an inner cylindrical surface, through which said cable passes, comprising in combination a tubular deflecting member provided with means for attaching it in a fluid tight manner to the cable sheath and having an outer surface formed with a first screw threaded part, a conical part and a second screw threaded part, the end of said conical part which has the smaller diameter being adjacent to said second screw threaded part, an internally threaded locking ring fitting on to said first screw threaded part, an internally threaded ring shaped compressing member coaxial with and fitting on to said second screw threaded part so that when rotated it moves axially towards or away from said conical part and a deformable sealing ring coaxial with said deflecting member and partly surrounding said conical part having a cross section substantially greater in its length parallel to its axis than its radial thickness which when compressed axially between said compressing member and said conical part is deformed and deflected outwards to bite into the inner cylindrical surface of said aperture.

2. A fluid tight joint between an electric cable and a member formed with an aperture through which said cable passes, comprising in combination a sheath of said cable, a tubular deflection member, with an outer conical surface, attached in a fluid tight manner to said sheath, a ring shaped compressing member coaxial with and movable axially relative to said deflecting member towards and away from said conical part thereof, a member formed with an aperture having an inner cylindrical surface through which said cable passes and a deformed sealing ring having a cross section substantially greater in its length parallel to its axis than its radial thickness compressed axially between said compressing member and said conical part and held distended by the latter so that it bites into said inner cylindrical surface.

3. Means for making a fluid tight joint between the sheath of an electric cable and a member formed with an aperture, having an inner cylindrical surface, through which said cable passes, comprising in combination a tubular deflecting member provided with means for attaching it in a fluid tight manner to the cable sheath and having an outer surface which includes a conical part, a ring-shaped compressing member coaxial with and movable axially relative to said deflecting member towards and away from said conical part thereof and a flexible sealing ring coaxial with said deflecting member and partly surrounding said conical part, said sealing ring being made of a metal harder than the material of said apertured member through which the cable passes, having a cross section substantially greater in its length parallel to its axis than its radial thickness and being adapted, when compressed axially between said compressing member and said conical part, to be deflected radially outwards by said conical part to bite into the inner cylindrical surface of said aperture.

4. Means for making a fluid tight joint between the sheath of an electric cable and a member formed with an aperture, having an inner cylindrical surface, through which said cable passes, comprising in combination a tubular deflecting member provided with means for attaching it in a fluid tight manner to the cable sheath and formed on its outer surface with a conical part and a screw threaded part, the end of said conical part which has the smaller diameter being adjacent to said screw threaded part, an internally threaded ring-shaped compressing member coaxial with and fitting onto the threaded part of said deflecting member so that when rotated it moves axially towards or away from said conical part and a flexible sealing ring coaxial with said deflecting member and partly surrounding said conical part, said sealing ring being made of a metal harder than the material of said apertured member through which the cable passes, having a cross section substantially greater in its length parallel to its axis than its radial thickness and being adapted, when compressed axially between said compressing member and said conical part, to be deflected radially outwards by said conical part to bite into the inner cylindrical surface of said aperture.

5. Means for making a fluid tight joint between the sheath of an electric cable and a member formed with an aperture having an inner cylindrical surface through which said cable passes, comprising in combination a tubular deflecting member provided with means for attaching it in a fluid tight manner to the cable sheath and formed on its outer surface in the following order with a conical part, a screw threaded part and a part shaped for gripping with a spanner, the end of said conical part which has the smaller diameter being adjacent to said screw threaded part, an internally threaded ring-shaped compressing member coaxial with and fitting onto the threaded part of said deflecting member so that when rotated it moves axially towards or away from said conical part and a flexible sealing ring coaxial with said deflecting member and partly surrounding said conical part, said sealing ring being made of a metal harder than the material of said apertured member through which the cable passes, having a cross section substantially greater in its length parallel to its axis than its radial thickness and being adapted, when compressed axially between said compressing member and said conical part, to be deflected radially outwards by said conical part to bite into the inner cylindrical surface of said aperture.

6. Means for making a fluid tight joint between the sheath of an electric cable and a member formed with an aperture, having an inner cylindrical surface, through which said cable passes, comprising in combination a tubular deflecting member provided with means for attaching it in a fluid tight manner to the cable sheath and with a tubular extension adapted to be attached to the armouring of the cable and having an outer surface which includes a conical part, a ring-shaped compressing member coaxial with and movable axially relative to said deflecting member towards and away from said conical part thereof and a flexible sealing ring coaxial with said deflecting member and partly surrounding said conical part, said sealing ring being made of a metal harder than the material of said apertured member through which the cable passes, having a cross section substantially greater in its length parallel to its axis than its radial thickness and being adapted, when compressed axially between said compressing member and said conical part, to be deflected radially outwards by said conical part to bite into the inner cylindrical surface of said aperture.

EDWARD LESLIE DAVEY.
FREDERICK REGINALD CREDLAND.

REFERENCES CITED

The following references are of record in the file of this patent:

UNITED STATES PATENTS

| Number | Name | Date |
|---|---|---|
| 1,497,002 | Sanderson | June 10, 1924 |
| 2,201,404 | Kreidel | May 21, 1940 |
| 2,211,856 | Kreidel | Aug. 20, 1940 |
| 2,352,159 | Brodie | June 27, 1944 |